United States Patent [19]  
Bobrysheva et al.

[11] 4,366,898  
[45] Jan. 4, 1983

[54] CONVEYOR OF A FARM MACHINE PICKUP

[76] Inventors: Ljubov V. Bobrysheva, ulitsa Aksaiskaya, 69/1, kv. 69; Boris P. Gavrilenko, ulitsa Matrosskaya, 9, kv. 54; Valery V. Markov, prospekt Selmash, 102"A", kv. 31; Leonid P. Minenko, ulitsa Narimanova, 72/1, kv. 6, all of Rostov-na-Donu, U.S.S.R.

[21] Appl. No.: 141,805

[22] Filed: Apr. 21, 1980

[51] Int. Cl.³ .................. B65G 15/44; B65G 13/02
[52] U.S. Cl. .................. 198/692; 198/697; 16/380
[58] Field of Search ............ 198/510, 698, 699, 692, 198/693, 697; 24/150 B, 243 E, 252 R, 155 C; 403/157, 159; 16/180, 168, 169, 192

[56] References Cited  
U.S. PATENT DOCUMENTS 2,332,259 10/1943 Reuther .................. 16/169
2,790,538 4/1957 Collins .................. 198/692
3,099,347 2/1961 Dahlquist .................. 198/692
3,546,822 12/1970 Hutchins .................. 16/169

Primary Examiner—John J. Love  
Assistant Examiner—Brian Bond  
Attorney, Agent, or Firm—Robert E. Burns; Emmanuel J. Lobato; Bruce L. Adams

[57] ABSTRACT

A characteristic feature of the proposed pickup conveyer, comprising drive shafts, a conveyer belt carrying support elements held thereto, spring-actuated double pickup fingers provided with a yoke-shaped interspring crosspiece and made fast on said support elements resides in the fact that said support element is shaped as a channel iron between the flanges of which the spring-actuated double pickup finger is mounted, said flanges having holes for a U-shaped holder to fit, one of the ends of said holder being recurvate towards the ends of the pickup fingers.

2 Claims, 3 Drawing Figures

CONVEYOR OF A FARM MACHINE PICKUP

BACKGROUND OF THE INVENTION

This invention relates to machines for picking various farm crops and is concerned more specifically with constructions of pickup conveyers.

The invention can be applied in constructions of conveyer pickups used for picking various farm crops both windrowed and spread.

Most extensive application has been gained by the pickup conveyor constructions featuring bolted attachment of the spring-actuated double pickup fingers to the conveyer belt. A disadvantage of said attachment resides in a hampered dismantling of the pickup finger owing to the fact that the anticorrosive protecting coating on the exposed threaded bolt portion is liable to wear away in the course of operation, and the thread is liable to corrode which, in turn, prevents the nut from backing off and causes the bolt to turn along with the nut inasmuch as to retain the bolt head located above the conveyer belt proves to be impossible. Thus, the pickup finger can be dismantled only after the belt has been removed from the conveyer or, at best, not until the conveyer is let to turn till assuming the position, wherein the bolt head rests upon one of the conveyer shafts.

One prior-art construction of the pickup conveyer is known, wherein the double spring-actuated pickup finger is fastened to the support element through a U-shaped plate holder which embraces the yoke-shaped interspring crosspiece of the finger and said support element at the front end of both, said support element being in somewhat raised position at the place of finger mounting in such a way that a gap is defined in between the conveyer belt and the support element. With its side projections the holder enters inside the finger springs. The holder is locked in place due to engaging of a hole provided at the center of the raised portion of the support element, by a spherical lug provided on the holder, said engagement occurring by virtue of elastic forces. The support element is secured on the belt by means of riveted joints. The afore-discussed construction, however, suffers from a number of disadvantages. Thus, for instance, said riveted joints are inadequately reliable; when picking the reaped crop mass asymmetric load occurs upon the pickup fingers, whereas the U-shaped plate holder performs its functions only in those cases where the point of the load application (or of application of the equivalent force of the loads applied at the finger ends) falls within the width of the holder crosspiece thrusting against the support element. If the load (or its equivalent force) is applied beyond the crosspiece a moment results that tends to turn the finger along with the holder with respect to the edge of the holder crosspiece, nearest to the point of the load application and to disengage the locking lug of the holder from the hole in the support element. Inasmuch as the locking force cannot be too high as otherwise the condition of easy detachability of the finger will not be met, it is quite obvious that unlocking (i.e., disengagement of the locking lug from the hole) is liable to occur under as low asymmetric loads applied. It is on the same account that the holder fails to perform its functions in the case of load reversal which might take place, e.g., when the farm machine travels backward.

The yoke-shaped interspring crosspiece of the pickup finger is made flat in a lateral projection both in the constructions with bolted attachment and in those with the U-shaped plate holder.

A disadvantage of such a construction of the crosspiece resides in great overstresses occurring in the material of the conveyer belt at the place of holding the pickup finger within the time space while the finger travels round the shaft. This is accounted for by the fact that the vertex of the flat crosspiece rises above the curved surface so that the load upon the finger is taken up by the belt over but a short attachment arm which equals half the bolt or rivet head diameter.

SUMMARY OF THE INVENTION

It is therefore a primary and essential object of the present invention to provide a construction of the pickup conveyer featuring such an attachment of the spring-actuated double pickup finger that would be easy-to-assemble and disassemble and reliable in operation.

It is another object of the present invention to reduce loads applied to the places of finger-to-belt attachment and thereby to add to the conveyr service life.

Said and other objects are accomplished due to the fact that in the conveyer of a farm machine pickup, comprising drive shafts, a conveyer belt carrying support elements held thereto, spring-actuated double pickup fingers provided with a yoke-shaped interspring crosspiece are made fast on the support element. According to the invention the support element is shaped as a channel iron between the flanges of which the spring-actuated double pickup finger is arranged. The flanges have holes to accommodate a U-shaped holder featuring one of its ends recurved towards the finger ends.

The support element has a bent tail provided with lateral projections under which the pickup finger yoke-shaped crosspiece is situated.

The yoke-shaped crosspiece of the pickup finger is made as a curve into which an arc can be inscribed, having a radius less than the outer radius of the belt on the conveyer shaft, said curve with its convex surface facing the side opposite to the conveyer belt and resting upon the latter with its loose end.

The essence of the proposed invention resides in the following: Arrangement of the U-shaped holder in the holes of the support element flanges, i.e., normally to the loads applied to the finger, provides for high reliability of the joint, since no forces are effective that would urge the holder to disengage the holes, whereas provision of an end of the holder recurvate towards the finger ends prevents the holder against disengaging from the holes due to vibration or occasional lateral loads. The holder is fitted in position and removed manually by being preliminarily compressed to have its recurvate end to pass through the holes in the flanges of the support element.

Provision of the support element with a bent tail with lateral projections checks excess upward travel of the finger about the shafts under the action of centrifugal forces.

Provision of the yoke-shaped interspring crosspiece as a curve into which an arc can be inscribed, having a radius less than the outer radius of the belt on the conveyer shaft and facing with its convex surface away from the belt ensures a permanent contact of the crosspiece vacant end with the belt which reduces load upon the belt at the place of its attachment due to a double-support mounting of the finger on the belt.

On the whole the present invention provides for high reliability and long service life of the pickup conveyer, as well as convenient installing and dismantling of the pickup fingers.

BRIEF DESCRIPTION OF THE DRAWINGS

For a better understanding of the essence of the present invention attached to a detailed disclosure thereof are the drawings of a specific exemplary embodiment of the proposed pickup conveyer, according to the invention. In the drawings.

DESCRIPTION OF THE PREFERRED EMBODIMENTS

Figure 1:
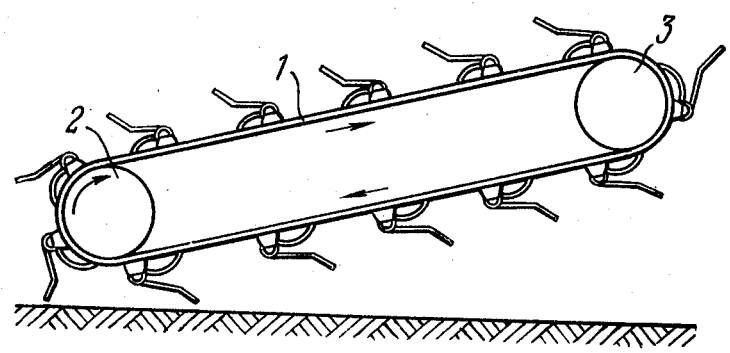
FIG. 1 is a schematic side-elevation view of the conveyer of a farm machine pickup.
Figure 2:
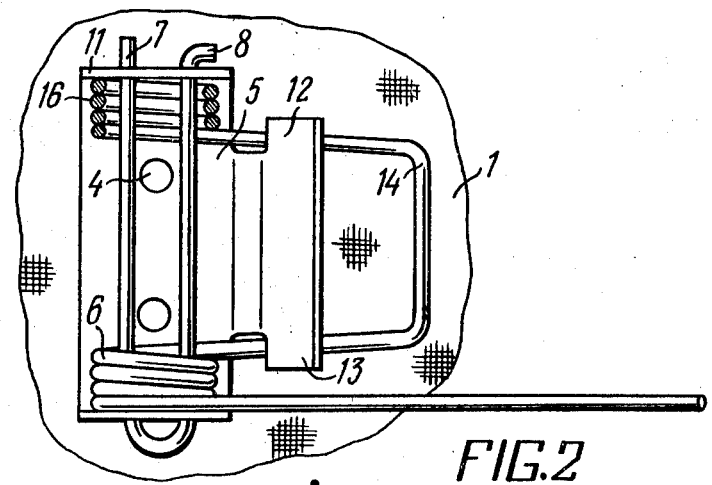
FIG. 2 is a plan view of the conveyer belt showing the pickup finger held thereto, the finger being illustrated in a sectional view taken through one of the springs thereof.
Figure 3:
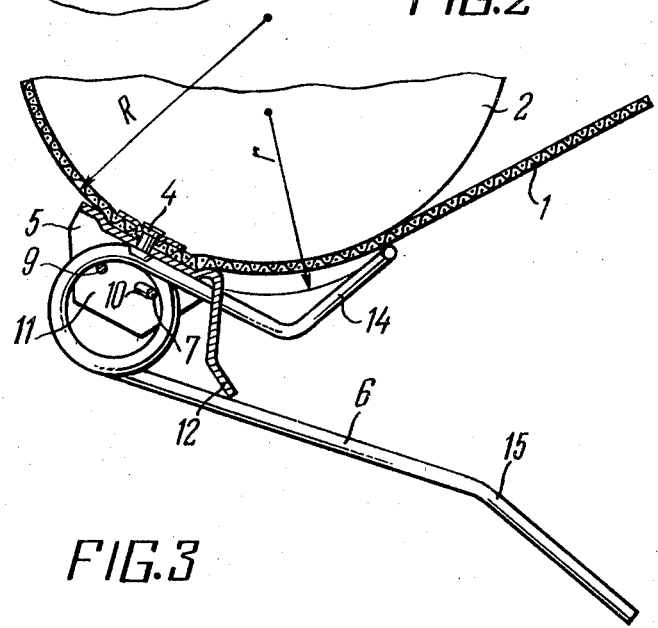
FIG. 3 is a conveyer sectional view taken along the front shaft thereof square with the shaft axis.

It should be stated that the scope of the present invention is wider than the specific exemplary embodiment thereof given in the present disclosure to illustrate the present invention, and is defined by the claims that follow.

The herein-proposed pickup conveyer consists of a conveyer belt 1, drive shafts 2 and 3, support elements 5, made fast on the conveyer belt through rivets 4, spring-actuated double pickup fingers 6, a U-shaped holder 7 having a recurvate end 8. The support element 5 is shaped as a channel iron having holes 9 and 10 in flanges 11 thereof, and has a bent tail 12 with side projections 13 under which a yoke-shaped interspring crosspiece 14 is situated. Apart from the arrangement of the holder 7 illustrated in the drawings another arrangement is also possible according to which the bent tail 12 of the support element 5 can be dispensed with. The spring-actuated double pickup finger 6 consists of working ends 15, springs 16 and a yoke-shaped interspring crosspiece 14 shaped as a curve into which an arc can be inscribed, having a radius r that is less than an outer radius R of the belt 1 on the conveyer shaft 2, As it is evident from the drawing the arc faces with its convex surface away from the belt 1.

The holder 7 is fitted in position and dismantled therefrom after having been compressed by a value sufficient for its recurvate end 8 to pass through the holes 10. The fact that the holder 7 rests upon two supports in the holes 9 and 10 of the flanges 11 square with the predominantly acting working loads at any degree of asymmetry of said loads, as well as the provision of the recurvate end 8 in the holder 7 prevent the device against spontaneous unlocking during operation, whereas the arrangement of the pickup finger 6 between the flanges 11 of the support element 5 precludes any permanent set of the springs 16 and the interspring crosspiece 14. Provision of the interspring crosspiece 14 shaped as a curve into which an arc can be inscribed having a radius $r < R$, affords a constant rest of the loose end of the crosspiece 14 upon the belt 1 with the finger 6 under load, i.e., ensures a double-support arrangement of the finger 6 on the belt 1, which substantially reduces the amount of stress on the material of the belt 1 effective in the area of the rivets 4, while the amount of stress resulting from the load relayed to the belt 1 by the loose end of the interspring crosspiece 14 is but negligible.

The present invention can be applied to best advantage in the constructions of the conveyer pickups of farm machines as substantially increasing their reliability and service life and rendering them more convenient in attending and repairs.

What is claimed is:

1. An endless driven transport conveyor, said conveyor having a plurality of flexible spring wire pickup fingers mounted on the conveyor spaced in a longitudinal direction of the conveyor, a separate mount for each pickup finger fixed on the conveyor, each mount comprising a channel iron fixed to the conveyor having laterally spaced flanges extending from the conveyor and an open channel extending in a longitudinal direction of the conveyor, each finger comprising a pair of wound coils spaced laterally in said channel between the flanges and having a yoke-shaped crosspiece connected to the coils and a finger extension from a convolution of one of coils extending away from said one of the coils out of the channel and away from the direction of travel of the conveyor, each channel iron having a trailing portion with lateral projections overlying respective legs of the yoke-shaped crosspiece, and a U-shaped holder for each pickup finger extending through the coils and removably fixed extending through the flanges of the corresponding mount for releasably holding the corresponding finger in place, the conveyor being an endless belt, and including driven driving shafts each of a given diameter over which the endless belt travels, each yoke-shaped crosspiece of the corresponding pickup finger being bent in a direction toward the belt at a bend spaced from said trailing portion, each said bend having a rate of curvature corresponding to a radius r, the driving shaft having a radius R in which $r < R$, and a projection on the trailing portion of each mount being bent in a direction away from the belt and having a free end against which said finger extension bears.

2. An endless driven transport conveyor according to claim 1, in which said finger extension having a portion of a free end bent away from the conveyor belt.

* * * * *